April 10, 1945.                H. M. SCARFF                2,373,344
                      PISTON RING CHAMFERING MACHINE
                         Filed Feb. 14, 1944         4 Sheets-Sheet 1

Inventor
Harold M. Scarff
By Lawrence and
Van Antwerp
Attorneys

April 10, 1945.  H. M. SCARFF  2,373,344
PISTON RING CHAMFERING MACHINE
Filed Feb. 14, 1944  4 Sheets-Sheet 3

Inventor
Harold M. Scarff
By Liverance and
Van Antwerp
Attorneys

April 10, 1945.  H. M. SCARFF  2,373,344
PISTON RING CHAMFERING MACHINE
Filed Feb. 14, 1944  4 Sheets-Sheet 4

Inventor
Harold M. Scarff
By Lawrence and
Van Antwerp
Attorneys

Patented Apr. 10, 1945

2,373,344

UNITED STATES PATENT OFFICE 2,373,344

PISTON RING CHAMFERING MACHINE

Harold M. Scarff, Muskegon, Mich., assignor to Muskegon Piston Ring Company, Muskegon, Mich., a corporation of Michigan Application February 14, 1944, Serial No. 522,277

10 Claims. (Cl. 77—3)

This invention relates to apparatus for chamfering piston rings. In the manufacture of certain types of piston rings an annular corner portion thereof is machined away thereby changing the rectangular cross section of the ring so that when the ring is closed at its parting, its flat sides are slightly distorted out of the plane that they would occupy if the ring had a uniform rectangular cross section. This is desirable in piston rings used with internal combustion engines, and the present invention is directed to a machine by means of which the rings may thus be machined and chamfered at the desired inner corner portion and by means of which very rapid machining and a high quantity production may be attained with a uniformity of product and without employment of skilled labor.

An understanding of the invention may be had from the following description taken in connection with the accompanying drawings, in which, Fig. 1 is an elevation of a machine embodying my invention, certain parts being broken away for better disclosure.

Fig. 8 is a diagram of wiring circuits used in controlling the machine operation.

Like reference characters refer to like parts in the different figures of the drawings.

Upon the bed 1, which is similar to a lathe bed, a stock 2, analogous to a tail-stock in a lathe, is permanently secured toward one end of the bed, spaced from which is a fixture 3 likewise permanently secured to the bed. Spaced a short distance from the fixture 3 is a stock 4, analogous to the head stock of a lathe, which is mounted for slidable movement on the lathe bed.

Figure 2:
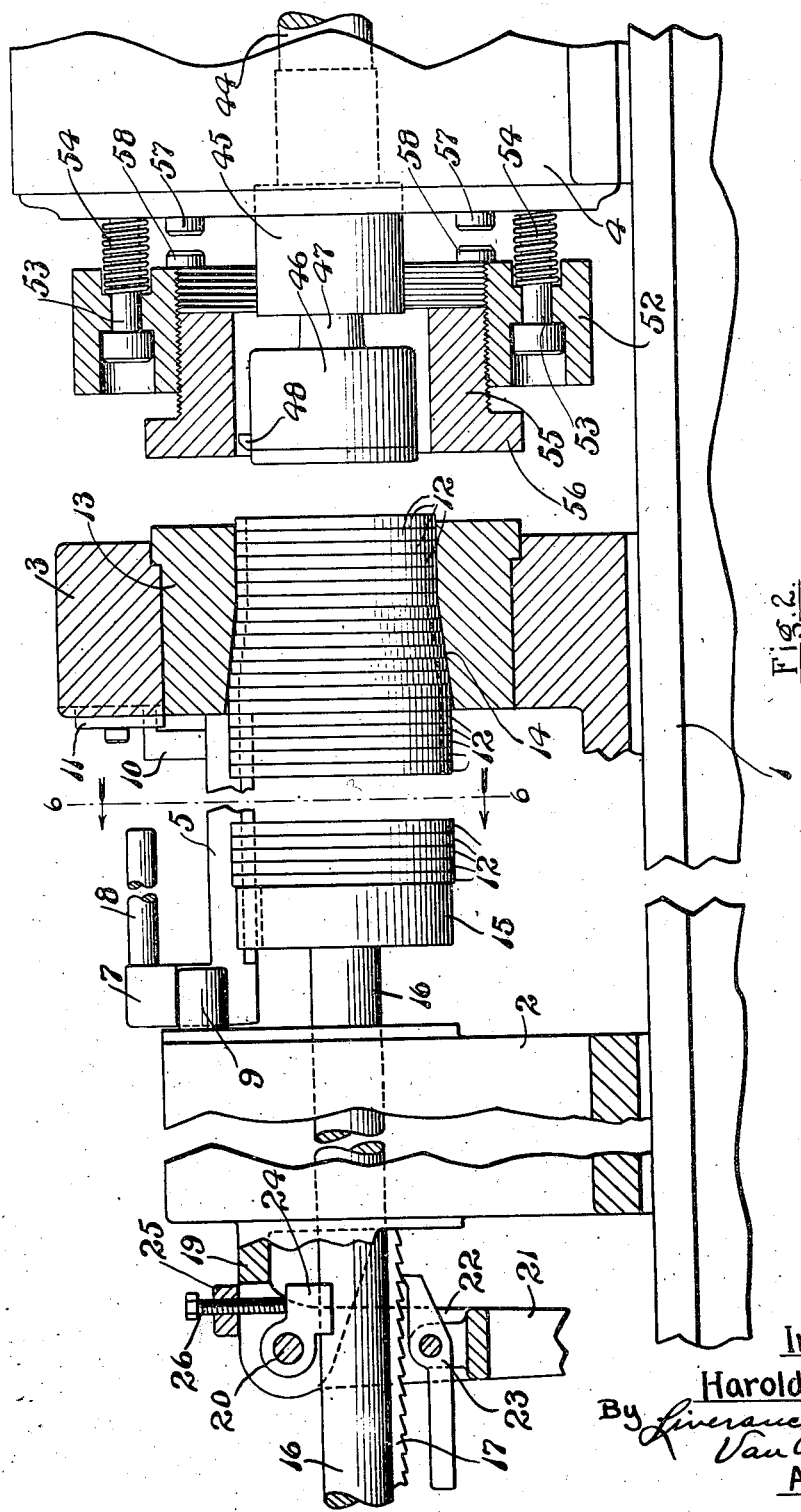
Fig. 2 is a fragmentary vertical longitudinal section through the operating mechanism.
Figure 6:
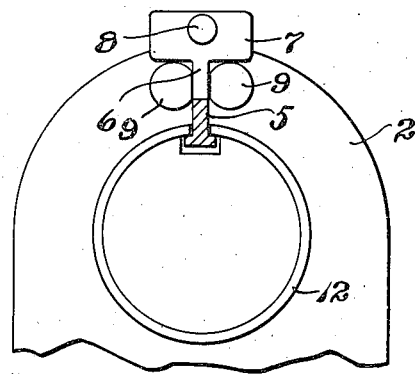
Fig. 6 is a transverse vertical section on the plane of line 6—6 of Fig. 2 looking in the direction indicated.
Figure 7:
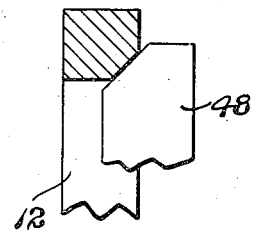
Fig. 7 is a sectional detail illustrating the inner chamfer cut on a piston ring and the machine tool for obtaining such cut.

The members 2 and 3 are fixed with respect to each other and between them a support for the piston rings which are to be machined is detachably carried. The piston ring support comprises a bar 5, T-shaped in cross section (Fig. 6), which at one end has an upwardly extending part 6 from which an upper horizontal bar portion 7 extends to each side. A rod 8 is fastened to the part 7 and extends over in substantial parallelism to the bar 5 for a part of its length. Two spaced pins or similar projections 9 extend from the adjacent side of the stock 2 between which the part 6 of the ring holding bar may be inserted with the upper portion 7 resting upon the pins 9 to thereby support the ring holding bar 5 at one end. At the other end a hook member 10 connected with the bar extends upwardly and is adapted to detachably connect with a plate 11 secured at the adjacent face of the fixture 3 (Fig. 3), entering an opening made in said plate as shown. The handle 8 may be grasped and the ring holding bar removed by lifting it upwardly and disengaging the hook 10 from the plate 11, the flanges of the T bar 5 terminating short of the pin 9 as shown in Fig. 2. On this bar a plurality of piston rings 12 may be suspended as shown in Fig. 6, the end portions of the ring at each side of the gap resting upon the lower flanges of the T-bar 5, and the upwardly extending leg of said bar 5 being located in the gaps between the ends of the rings. With this construction the rings 1 are movable lengthwise of the bar.

The fixture 3 has a horizontal opening therethrough in which a sleeve bushing 13 is secured, said bushing having an axial opening which at its end toward the piston rings is of larger diameter than at the other end, and progressively decreases in diameter, forming a conical surface as indicated at 14 for a part of the length of the opening. Accordingly when the piston rings are forced into the bushing 13 they are contracted and closed at their gaps after they have been forced through the bushing past the conical interior surface thereof.

Figure 1:
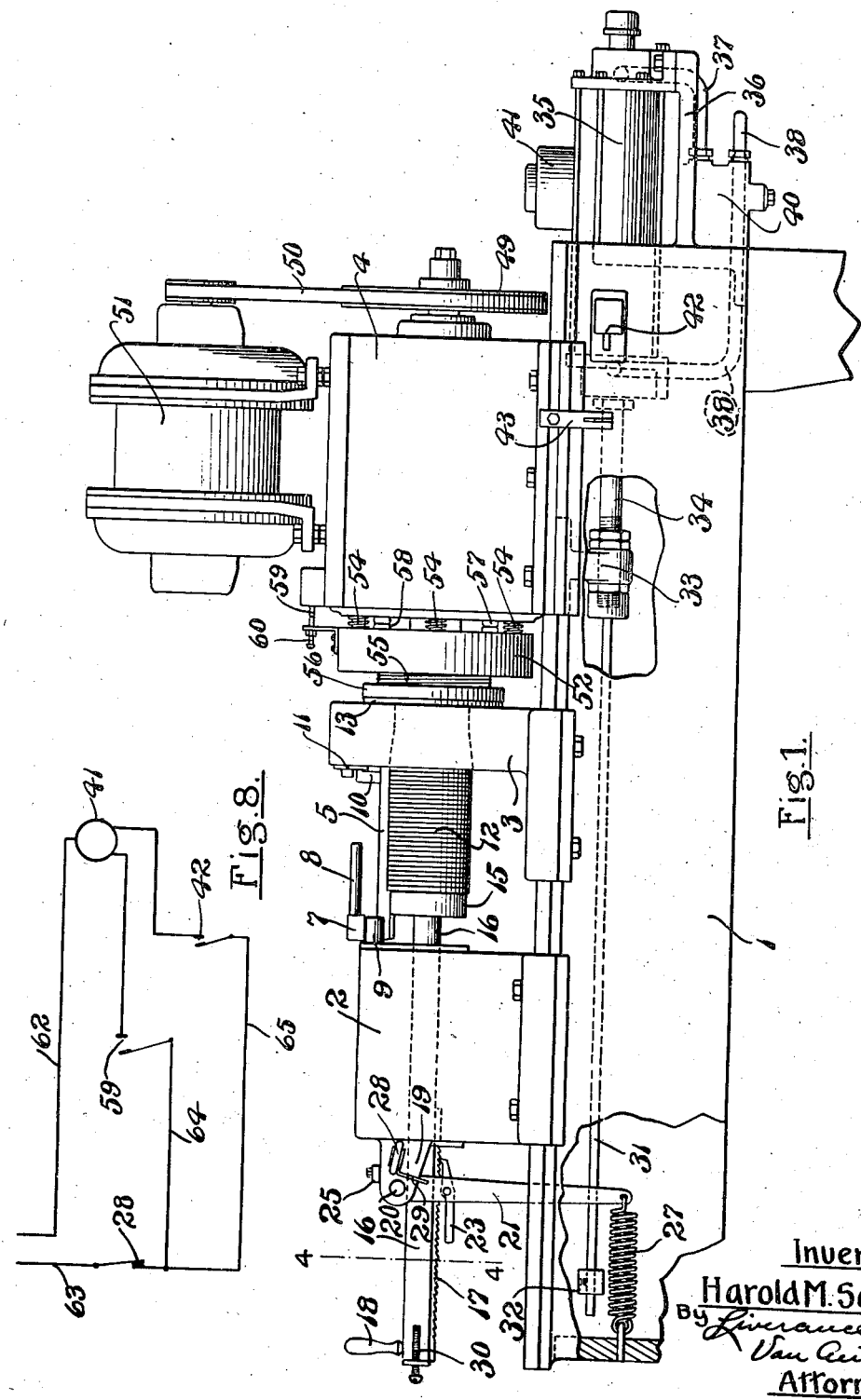
Figure 4:
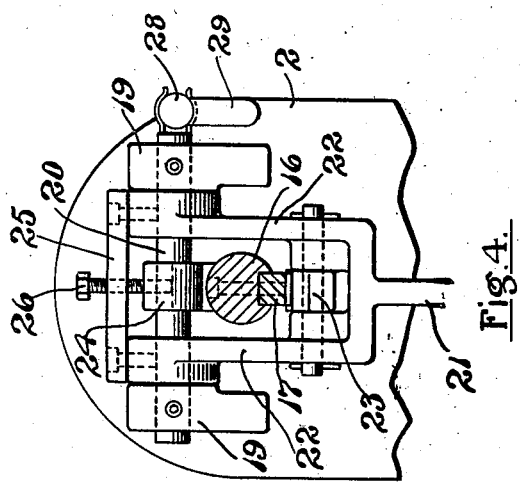
Fig. 4 is a fragmentary section and elevation substantially on the plane of line 4—4 of Fig. 1.

In the stock 2 a rod 16 is mounted for longitudinal reciprocation, having a head 15 at its inner end adapted to come against the end piston ring 12 of the rings suspended from the bar 5; and of course at the upper side of the head 15 it is longitudinally recessed so that it may pass along the lower portion of the bar 5 which extends into the recess. At its outer end portion the rod 16 carries a ratchet bar 17 at its under side, and it is equipped with a handle 18 near its outer end. Spaced brackets 19 (Figs. 2 and 4) extend outwardly from the member 2 above rod 16 between which is carried a rod 20. A lever 21 is forked at its upper end, the fork having spaced sides 22, through the upper ends of which the rod 20 passes whereby the lever 21 has a pivotal movement about the axis of the rod. A dog 23 is pivotally mounted between its ends on and between the sides 22 of the fork and at one end engages with the teeth of the ratchet bar 17. A brake 24 is mounted on the rod 20 and extends inwardly a short distance and has a concave under side to bear against the upper side of the rod 16. A cross bar 25 extends between and is permanently secured at the upper ends of the sides 22 of the fork through which a screw 26 (Fig. 2) passes bearing against the upper side of the brake 24 to adjust its pressure against rod 16. Normally the lever 21 is pulled by the spring 27 in a clockwise direction (Fig. 1). A switch 28 of the mercury tube type is mounted to turn upon a horizontal axis on one of the brackets 19 having depending from the holder thereof a finger 29 which is engaged by the end of the screw 30 upon movement of the head 15 and rod 16 to an extreme position to the right. The screw 30 is adjustably mounted as shown to thereby control the time of operation of the switch.

Figure 5:
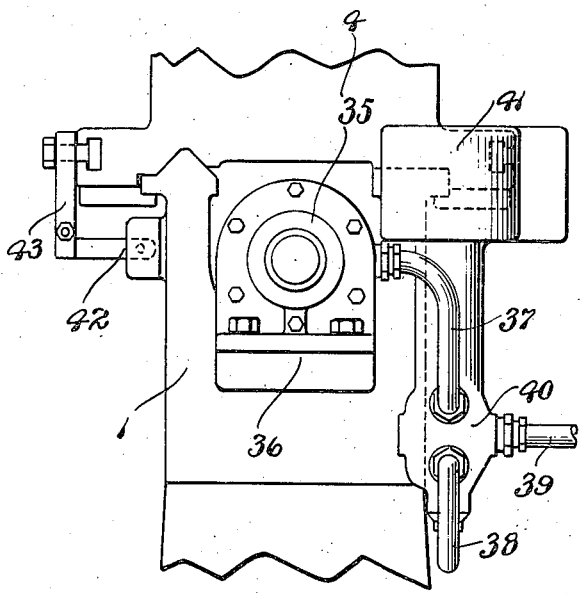
Fig. 5 is a fragmentary end elevation looking at the machine shown in Fig. 1 from the right and at the lower portion thereof.

A horizontal rod 31 passes through the lower end portion of the lever 21 and is provided adjacent its outer end with a block 32 adjustably mounted on the rod which, on movement of the rod 31 to the right (Fig. 1) will engage with and swing the lever 21 in a counter-clockwise direction against the force of the spring 27. In doing this the dog 23 engaging with the teeth of the ratchet bar 17 will cause a longitudinal movement of the rod 16 and attached head to the right moving the piston rings 12 along the bar and forcing them through the bushing 13. A bracket 33 is connected to and depends from the head stock 4 to which a piston rod 34 is secured together with the rod 31 by suitable couplings as shown (Fig. 1). The piston rod enters a horizontal cylinder 35 and is connected with the usual piston therein (not shown). The cylinder 35 is supported by the bracket 36 extending from the end of the lathe 1. Pipes 37 and 38 lead to opposite ends of the cylinder for carrying compressed air. The compressed air is delivered through an inlet pipe 39 (Fig. 5) connecting with a valve housing 40 to which the pipes 37 and 38 are also connected. Change of position of the valve within the valve housing directs the air selectively to either the pipe 37 or 38.

Above the valve housing 40 is a housing 41 within which are two solenoid windings (not shown) with the usual armature, the energizing of one solenoid winding opening the valve in one direction and of the other in the opposite direction. The control of the passage of current to the windings is by means of two switches, one of which at 42 is acted upon by a bar or finger 43 adjustably mounted, moving with and depending below the head stock 4 and engaging with the switch 42 and closing it upon the movement of the head stock 4 to the right (Fig. 1) the sufficient distance for the bar 43 to operate the switch. The adjustment of the bar 43 permits a control of the time when the switch is actuated. The other switch controlling the other solenoid will be hereafter described.

Figure 3:
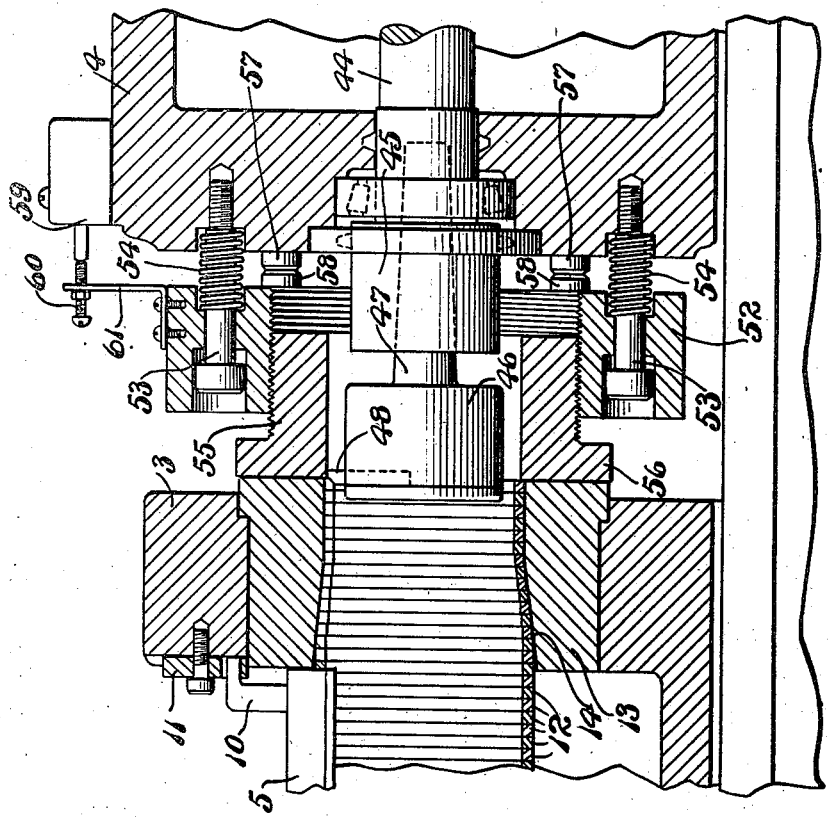
Fig. 3 is a fragmentary section, similar to that in Fig. 2, somewhat enlarged and illustrating a different position of the parts than in Fig. 2.

A rotatable shaft 44 is mounted horizontally on and extends through the head stock 4 at its inner end having a cylindrical socket head 45. A tool carrying head 46 provided with a tapered spindle 47 to be inserted into the socket 45 carries a chamfering tool 48 which projects outwardly from the head 46 in a position to successively machine the inner corners of the successive outermost piston rings 48 as shown in Fig. 3. The shaft 44 is equipped with a pulley 49 drawn by a belt 50 from an electric motor 51 secured at the upper side of and movable with the head stock 4.

An interiorly threaded ring 52 is movably mounted by means of screws 53 at the inner side of the head stock 4 as shown, coiled compression springs 54 around the screws normally tending to move the ring away from the adjacent side of the head stock until stopped by the heads of the screws engaging the bottoms of the recesses in which they are located, as in Fig. 2. An exteriorly threaded sleeve 55 is screwed into the ring 52 and is provided with a flange 56 at its outer end into which sleeve the tool carrying head 46 extends. The interior diameter of the opening through the sleeve 55 is slightly less than the exterior diameter of the rings that are processed when said rings are closed at their partings. The face of the flange 56 is adapted to come against the outermost ring at the position to which it has been moved in Fig. 2 and move it back until said face engages against the outer face of the bushing 13 as will hereinafter appear in the description of the machine operation. Cooperating stops 57 and 58 on the adjacent faces of the head stock 4 and the ring 53 limit the extent to which the springs 54 may be compressed upon movement of the head stock to the left (Fig. 3) and engagement of the flange 56 against the outer face of the bushing 13.

A second switch 59 is mounted upon and at the upper side of the head stock 4, adapted to be operated by the engagement thereagainst of the end of a screw 60 (Fig. 3) adjustably mounted at the upper end of a bracket 61 secured to the upper side of the ring 52. Said switch 59 and also the switches 42 and 28 are interposed in the circuit controlling completion of the solenoid windings housed within the housing 41. In Fig. 8 one wire 62 of the circuit leads to each of said solenoid windings, the other wire 63 has two branches, 64 and 65, which lead one to each of said solenoid windings and it is in said branches 64 and 65 that the switches 42 and 59 are interposed. The switch 28 is interposed in the circuit wire 63 ahead of the branches 64 and 65.

*Operation*

The rings 12 which are to be chamfered are loaded on the bar 5 with said bar suspended between the supports 9 and 11. Prior to the loading of the machine with the rings, the rod 16 has been pulled back manually as far as possible by a grasping of the handle 18 and releasing the dog 23, the end engaging the ratchet bar 17 being depressed by lifting the opposite end of the dog; and simultaneously the lever 21 may be pressed against to the right (Fig. 1) to relieve the brake at 24. After the loading has been completed the head 15 is brought against the outermost piston ring 12 by manually moving the rod 16 and the attached head in the opposite direction. The switch 28, in the position shown in Fig. 1 which is the position it normally occupies in operation, is closed. At the beginning of a cycle of operations compressed air has been previously entered into the cylinder 35, the appropriate switch 59 having been closed to position the valve within the housing at 40 for the passage of compressed air from the inlet pipe 39 to the pipe 38, and the head stock 4 with the various parts carried thereby has been moved to the extreme right, as in Fig. 3. But as soon as the bar 43 comes to and closes the switch 42 at such extreme of position of the head stock 4, the flow of compressed air is reversed and goes through the pipe 37 to the opposite end of the cylinder, moving the head stock in the opposite direction. The prior movement of the head stock 4 to the right brings the block 32 against the lever 21, thereby operating the dog against a ratchet tooth of the ratchet bar 17 and moving the body of piston rings to a position such that the outermost piston ring in the bushing 13 projects a short distance beyond its face as shown in Fig. 2; and the flange at 56 has been moved back from the face of the bushing.

Upon the reversal of direction of movement of the piston rod 34, because of the compressed air entering the outer end of the cylinder 35, the head stock 14 is moved in a direction toward the fixture 3 and the bushing therein, and the face of the flange 56 is brought against the end of the bushing with the tool carrying head 46 entering into said outermost ring and bringing the cutting edge of the tool 48 against the adjacent inner corner of the ring. A continuance of the movement takes place with a compression of the springs 54 with a corresponding feeding movement of the tool 48 a sufficient distance that the desired chamfer cut is removed from the ring. The outermost projecting ring, as it is shown in Fig. 2, is likewise engaged by the face of the flange 56 so that the outer face of the outermost ring is brought flush with the outer side of the bushing and the face of the flange 56, as in Fig. 3, at the completion of the machining. This forces the body of rings within the bushing back a slight distance against the friction of the compressed rings within the bushing and also against the action of the brake at 24. The end of the dog 23 is back of the tooth on ratchet bar 17 with which it was engaged in moving the rod 16 to the right a sufficient distance that such backward movement of the rings, and of course with them the head 15 and the rod 16 is permitted without danger of breakage.

When the machining of the outer ring has been completed, and the parts have reached the position shown in Fig. 3 switch 59 becomes closed, the compressed air is carried to the opposite end of the cylinder 35, and the head stock 4 and attached parts are retracted and moved to the position shown in Fig. 2. Simultaneously, through the rod 31 operating the lever 21 the machined ring is pushed out of the bushing so that it may drop downwardly, and the next succeeding ring is moved to the position shown in Fig. 2, immediately after and almost substantially coincident with which the switch 42 is closed with a consequent return movement of the head stock toward and eventually to the position in Fig. 3 for machining the succeeding piston ring and cutting its chamfer at its inner annular corner.

Such cycle of operations is repeated one after the other until the end of the screw at 30 engages against the finger at 29 and moves the switch 28 to open position, whereupon the machine is stopped in operation other than the rotation of shaft 44 and attached parts by the motor 51. This leaves the machine with the bushing substantially filled with piston rings, and ready to have a succeeding plurality of piston rings placed upon and suspended from the bar 5 after having first moved the rod 16 and the attached head 15 as far to the left as can be done, so the bar 5 may be loaded substantially the entire length of its T-flanges. Such movement of the rod 16 back releases the mercury switch at 28 which automatically moves to its closing position, and the machine is ready to take up its operation and go through the succeeding series of operative cycles until the switch 28 is again moved to circuit open position by the screw 30 engaging against the finger 29.

All that the attendant of the machine has to do is keep the bar 5 loaded with the proper sizes of rings. The machine has adjustments in the screws 30 and 60 and in the connection of the switch operating member 43 and in the adjustable block 32 to take care of various axial widths of rings within prescribed limits. The stops at 57 and 58 are not essential except perhaps for purposes of safety, as the closing of the switch at 59 will or should take place immediately before said stops come against each other. But in the event that the electrical connections were disturbed or out of order so that closing the switch at 60 did not result in the reversal of movement of the head stock 4, said stop means would insure against a continuation of feeding of the tool 48 into the ring being processed beyond a desired point. Therefore the machine will be and in practice is fully operative even though the stops at 57 and 58 are not used.

The machine described is in practical everyday use. With it a large quantity processing of the piston rings to obtain the desired chamfer is attained with uniformity in product. For different diameters of piston rings, different bushings 13, sleeves 55, tool carrying heads 46 and pusher heads 15 may be substituted with of course the necessary adjustment for timing the closing of the switches and the amount of movement imparted to the rod 16 by each swing of the lever 21 for taking care of the differing axial dimensions of said piston rings. The invention is exceptionally practical and useful, is defined in the appended claims and is to be considered comprehensive of all forms of structure coming within their scope.

I claim:

1. Means for supporting a plurality of parted piston rings in side by side contact with each other, means for periodically moving the rings axially a short distance, means for closing the rings at their partings at one end of the plurality of rings and holding said rings closed, and means for moving a rotating cutter tool toward and away from the outer side of the outermost of said closed rings to machine said outermost ring between periodic axial movements of the rings, said tool being moved away from the outermost ring after the machining thereof, whereby the succeeding axial movement of the rings releases the machined ring from said ring closing and holding means.

2. A bar having a lateral flange at its lower edge at each side thereof on which flanges a plurality of parted piston rings are adapted to be suspended, a fixture supporting one end of the bar, a sleeve bushing passing through the fixture, said bushing having an opening therethrough with conical sides whereby piston rings are contracted and closed at their partings when forced therein, a support for the other end of said bar, a plunger slidably mounted through the support having a head to engage against the outer piston ring at one end of a plurality of piston rings carried on said bar, means for intermittently moving said plunger in one direction to force the piston rings through the bushing at intervals with periods of rest between said movements, and means for machining the ring at the other end of the plurality of piston rings while it is held by and in closed position within said bushing, said machined ring being forced from said bushing and released upon the next succeeding periodic movement imparted to all the rings.

3. A construction containing the elements in combination defined in claim 2, said means for intermittently moving said plunger and head comprising, a slidably mounted actuating rod, means for reciprocating said actuating rod, a lever pivotally mounted on the second mentioned support for said bar, said actuating rod extending adjacent the lever, a block on the actuating rod to engage against and move the lever about its pivot on movement of the actuating rod toward said fixture, a spring connected to said lever normally acting to move the lever in the opposite direction, a ratchet dog pivotally mounted on said lever, and a ratchet bar secured to and lengthwise of the first mentioned rod with which said dog engages.

4. A support, a plunger slidably mounted on said support, a fixture spaced from the support, a bushing on said fixture having an opening with conical sides therethrough, means adapted to carry a plurality of parted piston rings between the support and fixture, a head stock located a distance from said fixture, means for moving said head stock toward and away from said fixture, means connected with said head stock for periodically moving said plunger toward the fixture, said movement occurring when the head stock is moved away therefrom, a rotatable shaft mounted on the head stock, means for driving said shaft, and a machining tool carried by said shaft at its inner end to machine the endmost of the piston rings passing through the opening in the bushing.

5. A construction containing the elements in combination defined in claim 4, and a ring movably mounted on said head stock between it and said fixture around the shaft, spring means normally moving the ring away from the head stock, means to stop the ring at an outer extreme of said movement, and means carried by the ring engageable against the adjacent end of the bushing and partly against the end piston ring therein around the peripheral side portions thereof.

6. In apparatus as disclosed, means for periodically moving a predetermined quantity of open parted piston rings located side by side in an axial direction, means into and through which the rings are passed to close the rings at their partings, a rotatable tool carrying member, means on which it is rotatably mounted movable toward and away from the outermost closed piston rings in succession to successively machine the rings and a common means for periodically moving the piston rings and for reciprocating the tool carrying means, with the periodic movements of the rings taking place when the tool carrying member is moved away from the rings.

7. A construction as in claim 6, in which said common means for moving the piston rings and reciprocating the tool carrier comprises a pneumatic operating cylinder and piston rod reciprocable thereby, means for supplying pneumatic pressure alternately to opposite ends of the cylinder including a movable control valve, electric means for operating said valve including two electric circuits each with a switch therein and means mounted on the tool carrying means for alternately closing said switches to operate said valve to alternately direct pneumatic pressure to opposite ends of the cylinder.

8. In an apparatus as described, a fixed bushing having a tapered opening therethrough, and an outer face adjacent the smaller end of said opening, a cutter head movable toward and away from the outer face of said bushing, a rotatable cutter mounted on said cutter head, means for intermittently pushing rings through the opening in said bushing one at a time, said means pushing the forward face of the forward ring beyond the forward face of the bushing, means for moving said cutter head toward said bushing to an accurate position relative to the forward ring and means to retract said forward ring to a position whereat its forward face will be accurately located relative to the forward face of the bushing.

9. The elements of claim 8 in which said means for retracting the forward ring is carried by said cutter head.

10. The elements of claim 8 in which said means to retract said forward ring is carried by said cutter head and engages the forward face of the bushing when effecting the retraction and is yieldable axially of the cutter when it engages the forward face of the bushing.

HAROLD M. SCARFF.